United States Patent
Yamanaka et al.

(10) Patent No.: US 9,475,545 B2
(45) Date of Patent: Oct. 25, 2016

(54) BICYCLE CRANK ARM AND BICYCLE CRANK ASSEMBLY

(71) Applicant: Shimano Inc., Sakai, Osaka (JP)

(72) Inventors: Masahiro Yamanaka, Osaka (JP); Yusuke Nishimoto, Osaka (JP); Tetsu Nonoshita, Osaka (JP); Yuki Watanabe, Osaka (JP)

(73) Assignee: Shimano Inc., Osaka (JP)

( * ) Notice: Subject to any disclaimer, the term of this patent is extended or adjusted under 35 U.S.C. 154(b) by 181 days.

(21) Appl. No.: 13/728,294

(22) Filed: Dec. 27, 2012

(65) Prior Publication Data

US 2014/0182413 A1 Jul. 3, 2014

(51) Int. Cl.
*B62M 3/00* (2006.01)

(52) U.S. Cl.
CPC ............ *B62M 3/00* (2013.01); *Y10T 74/2164* (2015.01)

(58) Field of Classification Search
CPC ...... B62M 3/00; B62M 3/003; B62M 9/105; F16H 55/30; Y10T 74/2164; Y10T 74/2165
USPC .......... 74/594.1–594.7; 280/259–261, 281.1; 487/57
See application file for complete search history.

(56) References Cited

U.S. PATENT DOCUMENTS

| | | | |
|---|---|---|---|
| 611,137 A * | 9/1898 | Morrison | B62M 3/003 384/544 |
| 2,350,468 A | 6/1944 | Kraeft | |
| 5,197,353 A * | 3/1993 | Trenerry et al. | 74/594.1 |
| 5,609,070 A * | 3/1997 | Lin et al. | 74/594.1 |
| 5,941,135 A * | 8/1999 | Schlanger | 74/594.1 |
| 6,058,803 A * | 5/2000 | Yamanaka | 74/594.1 |
| 6,059,171 A * | 5/2000 | Yamanaka et al. | 74/594.1 |
| 6,475,110 B1 * | 11/2002 | Yamanaka | 474/144 |
| 2003/0019324 A1 | 1/2003 | Valle | |
| 2006/0101940 A1* | 5/2006 | Okada | 74/594.1 |
| 2007/0095164 A1* | 5/2007 | Yamanaka et al. | 74/594.1 |
| 2007/0241530 A1* | 10/2007 | Nonoshita et al. | 280/259 |
| 2007/0283781 A1* | 12/2007 | Meggiolan | 74/594.1 |
| 2012/0042746 A1* | 2/2012 | Nonoshita et al. | 74/594.2 |

FOREIGN PATENT DOCUMENTS

| CN | 1186748 A | 7/1998 | |
| EP | 1120336 A2 * | 8/2001 | ............. B62M 3/00 |
| FR | 756054 A * | 12/1933 | ............. B62M 3/00 |
| WO | 2005068284 A1 | 7/2005 | |

* cited by examiner

*Primary Examiner* — Daniel Yabut
(74) *Attorney, Agent, or Firm* — Global IP Counselors

(57) ABSTRACT

A bicycle crank arm includes a first member and a second member. The first member has a crank axle interacting portion and a first recessed part around the crank axle interacting portion. The second member is attached to the first member. The first member has a first side facing the second member and a second side opposite to the first side. The first recessed part is recessed from the second side toward the first side such that the first recessed part includes an attachment area attached to the second member on the first side.

20 Claims, 11 Drawing Sheets

BICYCLE CRANK ARM AND BICYCLE CRANK ASSEMBLY

BACKGROUND

1. Field of the Invention

This invention generally relates to a bicycle crank arm. More specifically, the present invention relates to a bicycle crank arm for a bicycle. Furthermore, the present invention relates to a bicycle crank assembly.

2. Background Information

Conventional bicycle crank assemblies are known in which a crank axle is fixed to a crank arm (e.g., European Laid-Open Patent Application No. 1 449 760). The conventional crank assembly has a crank axle and a one-piece crank arm in which the crank axle is fixed. A sprocket is detachably fixed to the crank arm. The crank axle is fixed to the crank arm by, for example, an axle bolt, a press-fitting manner or swaging.

SUMMARY

It has been discovered that using a crank arm having a plurality of pieces can reduce the weight further in comparison with the conventional one-piece crank arm. However, it has also been discovered that with a crank arm having a plurality of pieces, it is necessary to ensure that the pieces of the crank arm are securely fixed to each other. One object presented in the present disclosure is to provide a bicycle crank arm in which a plurality of pieces is securely coupled to each other.

In view of the state of the known technology, a bicycle crank arm is provided that basically includes a first member and a second member. The first member has a crank axle interacting portion and a first recessed part around the crank axle interacting portion. The second member is attached to the first member. The first member has a first side facing the second member and a second side opposite to the first side. The first recessed part is recessed from the second side toward the first side such that the first recessed part includes an attachment area attached to the second member on the first side.

These and other objects, features, aspects and advantages of the bicycle crank arm and the bicycle crank assembly presented in this disclosure will become apparent to those skilled in the art from the following detailed description, which, taken in conjunction with the annexed drawings, discloses several embodiments.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Referring initially to FIGS. 1 to 4, a bicycle crank assembly 10 is illustrated in accordance with one embodiment. The bicycle crank assembly 10 basically includes a hollow crank axle 11, and first and second crank arms 12 and 13.

Figure 7:
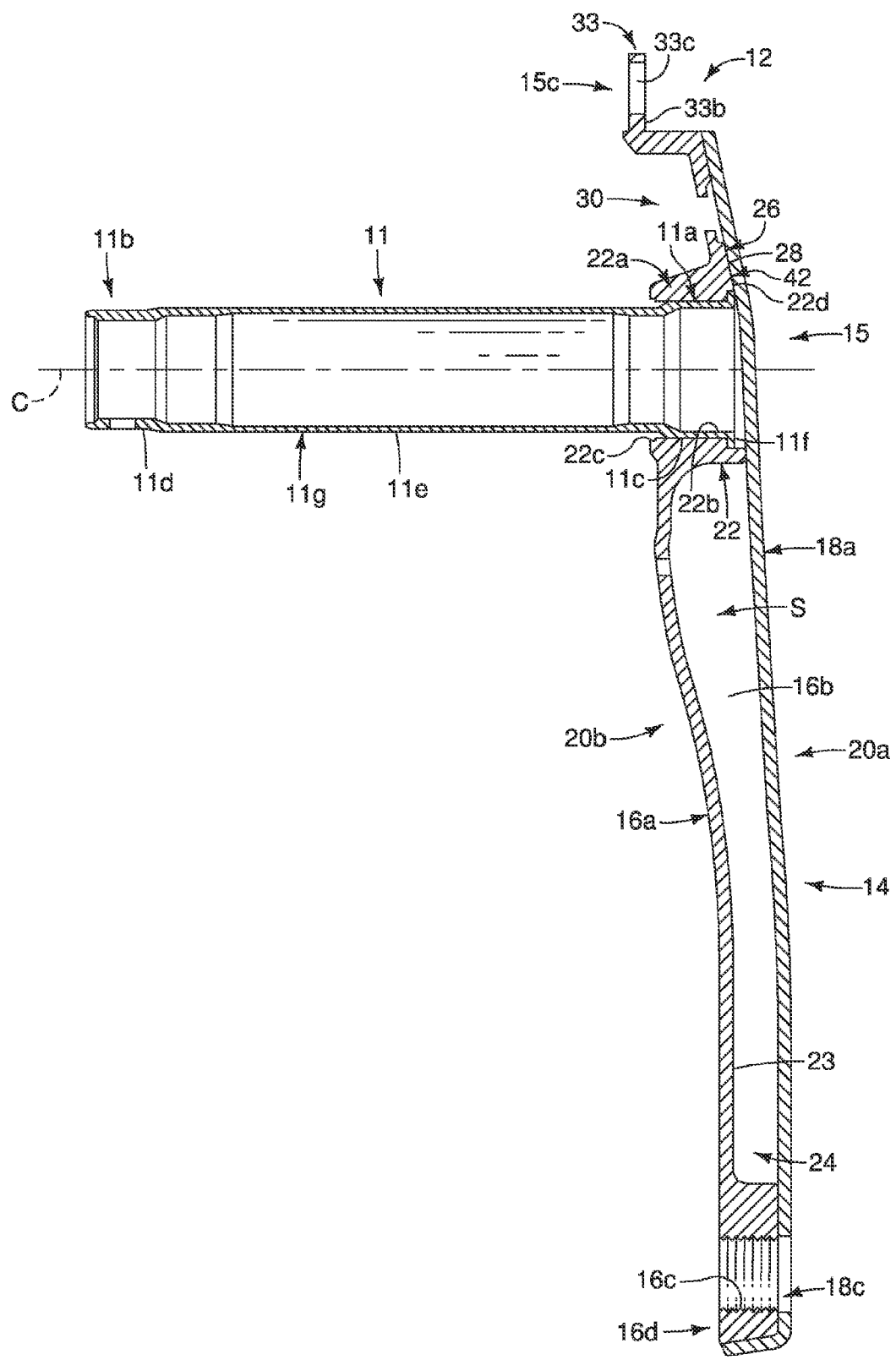
FIG. 7 is a cross sectional view of the first crank arm and the crank axle of the bicycle crank assembly taken along VII-VII line in FIG. 5.
Figure 8:
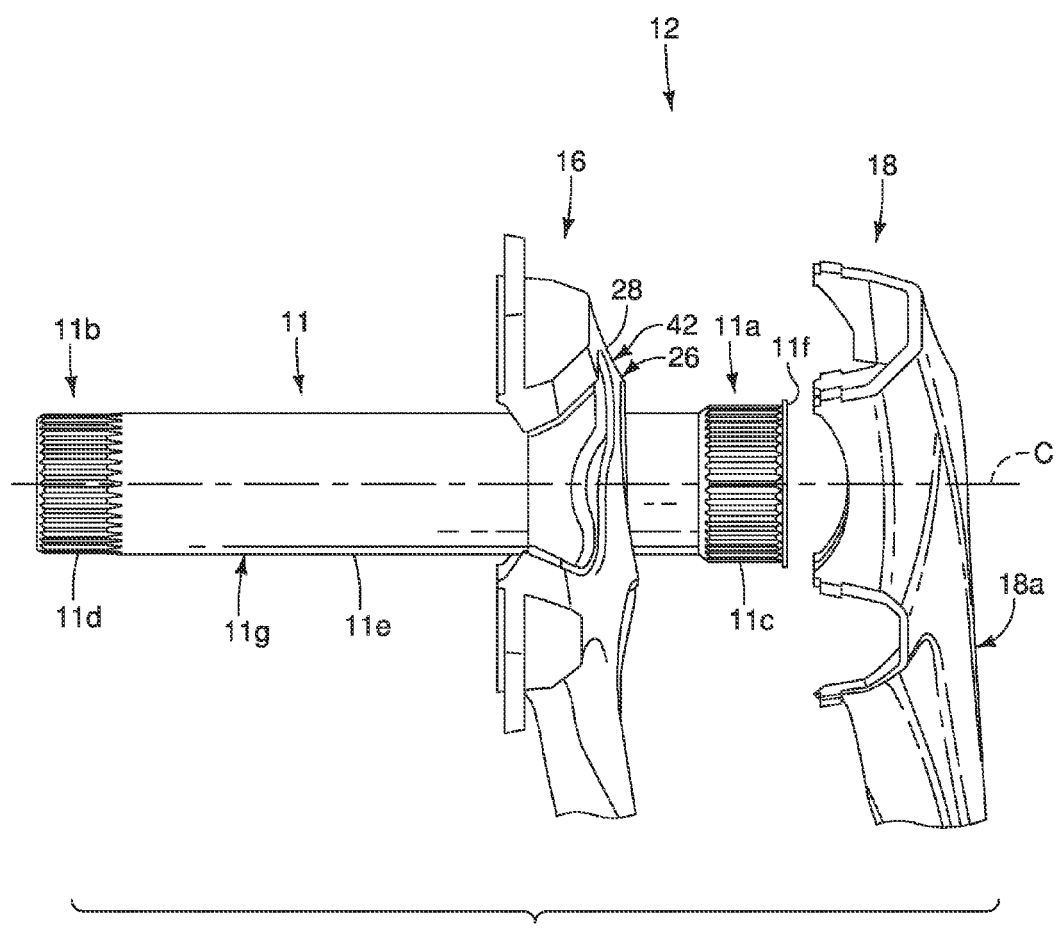
FIG. 8 is a partial, exploded rear side devotional view of first and second crank parts (e.g., first and second members) of the first crank arm and the crank axle of the bicycle crank assembly illustrated FIG. 1.

The crank axle 11 is rotatably supported with a bearing in a bottom bracket hanger of a bicycle frame (not shown in drawings). The crank axle 11 defines a center axis C of the bicycle crank assembly 10. As seen in FIGS. 7 and 8, the crank axle 11 includes a first end portion 11a (e.g., a right end portion in FIGS. 7 and 8), a second end portion 11b (e.g., a let end portion in FIGS. 7 and 8) and an intermediate portion 11g that is disposed between the first and second end portions 11a and 11b. The first end portion 11a is located in a first axial direction (e.g., a first side or a rightward direction in FIGS. 7 and 8) along the center axis C with respect to the second end portion 11b. The second end portion 11b is located in a second axial direction (e.g., a second side or a leftward direction in FIGS. 7 and 8) along the center axis C with respect to the first end portion 11a. The second axial direction is axially opposite the first axial direction along the center axis C. The first end portion 11a has a plurality of first splines 11c, while the second end portion 11b has a plurality of second splines 11d. The crank axle 11 further includes a projection 11f that protrudes outward in a radial direction of the crank axle 11 farther than an external surface 11e of the intermediate portion 11g of the crank axle 11. The intermediate portion 11g is axially disposed between the first and second end portions 11a and 11b of the crank axle 11. In the illustrated embodiment, the first splines 11e positioned at the first end portion 11a extend radially outward relative to the external surface 11e of the intermediate portion 11g of the crank axle 11, while the second splines 11d positioned at the second end portion 11b do not extend radially outward relative to the external surface 11e of the intermediate portion 11g of the crank axle 11. In particular, the second splines 11d extend radially inward relative to the external surface 11e of the intermediate portion 11g of the crank axle 11, while an outer diameter of a crest of the second splines 11d is smaller than that of the external surface 11e of the intermediate portion 11g of the crank axle 11. Alternatively, the second splines 11d can be flush with the external surface 11e of the intermediate portion 11g of the crank axle 11, while the outer diameter of the crest of the second splines 11d is equal to that of the external surface 11e of the intermediate portion 11g of the crank axle 11. The second splines 11d are preferably designed so that the second end portion 11b of the crank axle 11 is capable of passing through at least a part of the first crank arm 12 first, and then engages with the second crank 13. In the illustrated embodiment, the projection 11f is disposed at the first end portion 11a of the crank axle 11. The projection 11f is positioned axially outward relative to the first splines 11c at the first end portion 11a. The projection 11f prevents the first crank arm 12 from axially outwardly moving relative to the crank axle 11 in the first axial direction of the crank axle 11. In the illustrated embodiment, the projection 11f is a flange formed integrally around a circumference of the crank axle 11. Alternatively, the projection 11f can be shaped to be at least one pin-like member. A plurality of projections 11f can be circumferentially disposed around the first end portion 11a of the crank axle 11. The projection 11f preferably extends radially outward from the first splines 11c at the first end portion 11a. The projection 11f can also be flush with a crest of the first splines 11c at the first end portion 11a, or even can extend radially inward relative to the crest of the first splines 11c at the first end portion 11a as long as the projection 11f extends radially outward relative to a bottom of the first splines 11c. In the illustrated embodiment, the first crank arm 12 is fixedly coupled to the first end portion 11a of the crank axle 11, while the second crank arm 13 is fixedly coupled to the second end portion 11b of the crank axle 11.

As further illustrated in FIGS. 1 to 4, the first crank arm 12 (e.g., a bicycle crank arm) basically has a crank main body 14 and a sprocket mounting body 15. The first end portion 11a of the crank axle 11 is fixed to the crank main body 14, as shown in FIGS. 7 and 8. In the illustrated embodiment, the crank axle 11 is fixed to the crank main body 14 in a press-fit manner (i.e., interference fit). The sprocket mounting body 15 radially extends from one end of the crank main body 14. A pair of sprockets (not shown) is fixedly attached to the sprocket mounting body 15. In the illustrated embodiment, the first crank arm 12 is basically formed of two pieces. Specifically, the first crank arm 12 includes a first crank part 16 (e.g., a first member) and a second crank part 18 (e.g., a second member) that is attached to the first crank part 16. The first and second crank parts 16 and 18 are made of, for example, an aluminum alloy or other metal. Alternatively, the first and second crank parts 16 and 18 can be made of other non-metallic material such as fiber-reinforced plastic. In the illustrated embodiment, the first crank part 16 is integrally formed as a one-piece, unitary member, while the second crank part 18 is integrally formed as a one-piece, unitary member. The first crank part 16 provides most of the rigidity of the crank main body 14 and the sprocket mounting body 15. The second crank part 18 is mounted to the first crank part 16 so as to cover the first crank part 16. The second crank part 18 provides the remainder of the rigidity of the crank main body 14 and the sprocket mounting body 15 and also serves an ornamental function. Thus, in the illustrated embodiment, the first crank part 16 is thicker than the second crank part 18. Alternatively, the second crank part 18 can be designed so that the second crank part 18 provides most of the rigidity of the crank main body 14 and the sprocket mounting body 15. The first and second crank parts 16 and 18 are fixedly coupled to each other with, for example, an adhesive. In the illustrated embodiment, the first and second crank parts 16 and 18 are coupled together such that an interior space S is formed therebetween. In particular, the first crank part 16 has first and second sides 20a and 20b that are opposite to each other. The first side 20a of the first crank part 16 faces the second crank part 18 while the first and second crank parts 16 and 18 are coupled to each other. In the illustrated embodiment, the first side 20a generally faces towards the first axial direction, while the second side 20b generally faces towards the second axial direction.

Referring to FIGS. 5 to 11, the configurations of the crank main body 14 of the first crank arm 12 will be discussed in detail. The crank main body 14 is a hollow rod-like member that extends from the crank axle 11 in the radial direction of the crank axle 11.

Figure 6:
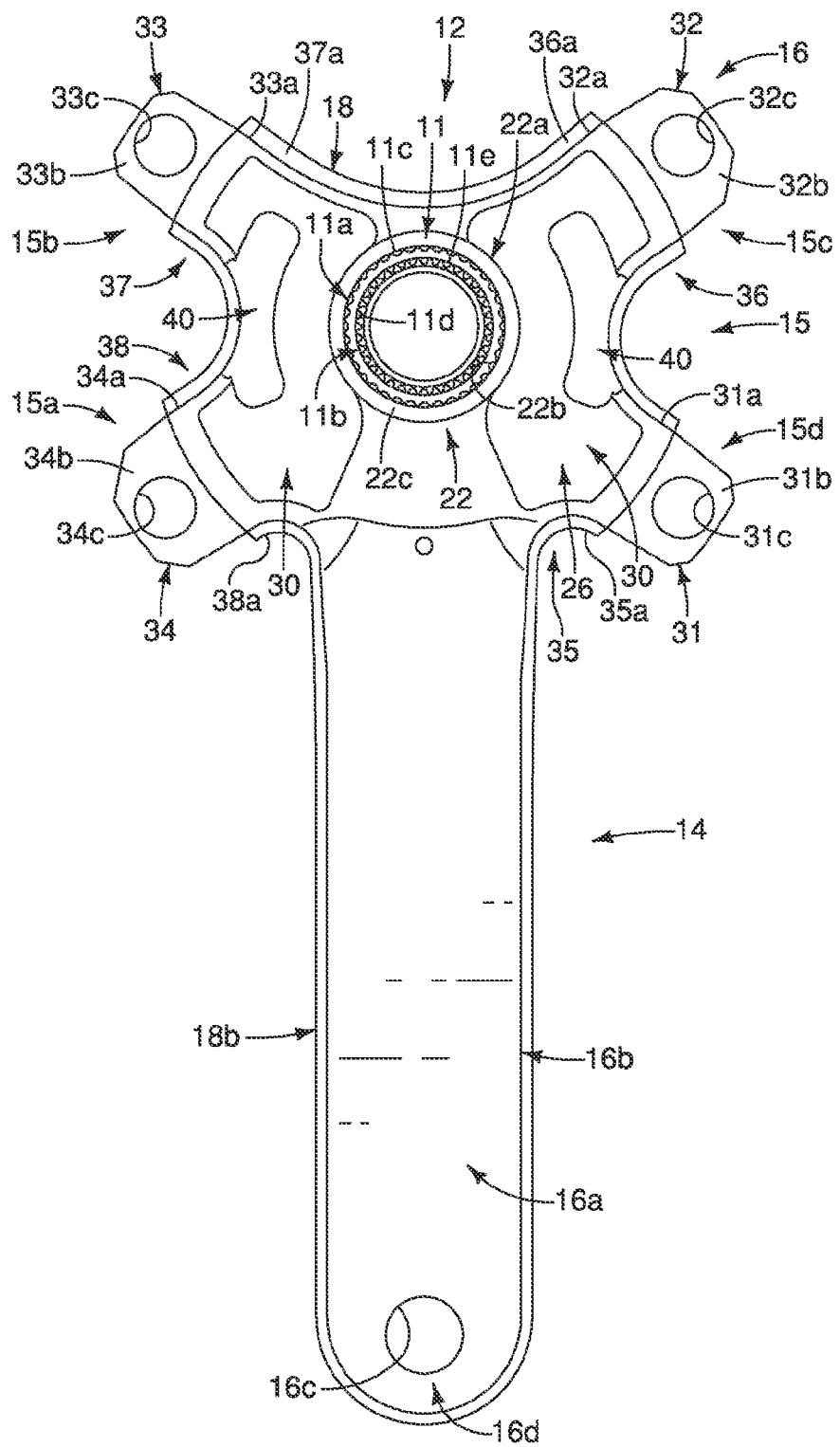
FIG. 6 is an inside elevational view of the first crank arm of the bicycle crank assembly illustrated in FIG. 1, with a crank axle of the bicycle crank assembly attached the first crank arm.
Figure 10:
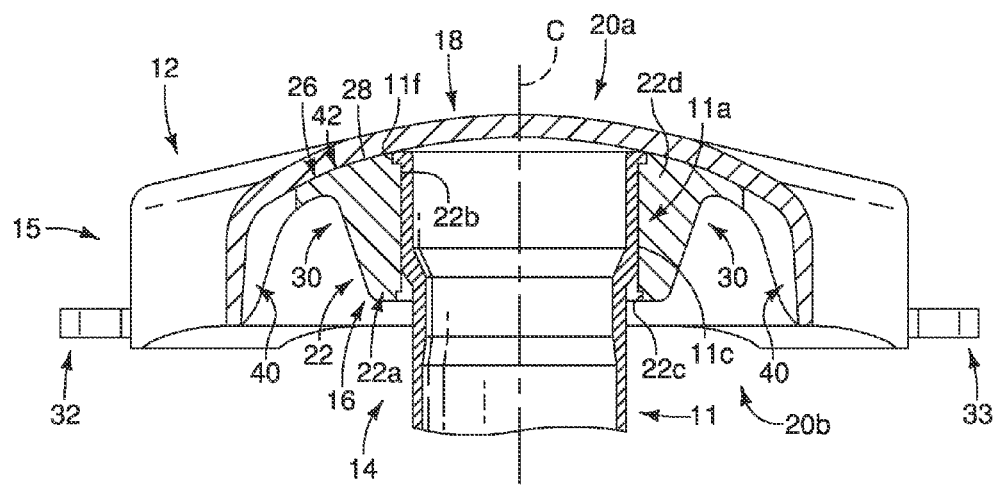
FIG. 10 is a cross sectional view of the first crank arm of the bicycle crank assembly taken along X-X line in FIG. 5.

As shown in FIGS. 6 and 7, the first crank part 16 has a crank axle supporting section 22 (e.g., a crank axle interacting portion). The crank axle supporting section 22 is arranged on a base end of the crank main body 14. The crank axle supporting section 22 engages with the first end portion 11a of the crank axle 11 to support the first end portion 11a. In the illustrated embodiment, the crank axle supporting section 22 is formed as a one-piece integral unit with the first crank part 16. The crank axle supporting section 22 has a cylindrical portion 22a and a plurality of internal splines 22b. The internal splines 22b are formed on an internal circumferential surface of the cylindrical portion 22a. The internal splines 22b are configured to engage with the first splines 11c of the first end portion 11a such that the first crank part 16 and the crank axle 11 rotate as a unit. The crank axle 11 is inserted into the cylindrical portion 22a from the second end portion 11b on the opposite side of the first end portion 11a. According to the present application, the crank axle interacting portion of the first member can be configured to be fixedly coupled to the crank axle in a press-fit manner. Thus, the crank axle 11 is fixed to the first crank part 16 by being inserted into the cylindrical portion 22a in a press-fit manner so that the first splines 11c formed on the first end portion 11a engage with the internal splines 22b of the crank axle supporting section 22 for fixing the crank axle 11 to the first crank part 16. Alternatively, according to the present application, the crank axle interacting portion of the first member can also be configured to be fixedly coupled to the crank axle with an adhesive. Thus, it is also acceptable to fix the crank axle 11 to the first crank part 16 with an adhesive. In such a case, the first splines 11c of the crank axle 11 and the internal splines 22b of the crank axle supporting section 22 are fitted together with a gap in-between instead of in a press-fit manner. Furthermore, it is also acceptable to fix the crank axle 11 to the first crank part 16 with an axle bolt or by swaging. As shown in FIGS. 7 and 10, a portion of the second crank part 18 that faces the crank axle supporting section 22 of the first crank part 16 is configured to cover the crank axle supporting section 22. In this way, the crank axle supporting section 22 is not exposed so as to be visible from the outside. The wording of "crank axle interacting portion" is not limited to a portion directly supporting a crank axle. For example, it is also acceptable to form a crank axle supporting section on the second crank part 18 instead of the first crank part 16 whereas the first crank part 16 is designed to have a through hole through which the crank axle 11 passes. In such a case, the through hole of the first crank part 16 is also regarded as a crank axle interacting portion. Of course, in the case of a crank axle supporting section being formed on the second crank part 18, the crank axle 11 can be fixedly coupled to the crank axle supporting section formed on the second crank part 18 in a press-fit manner, with an adhesive, with an axle bolt, or by swaging.

Figure 11:
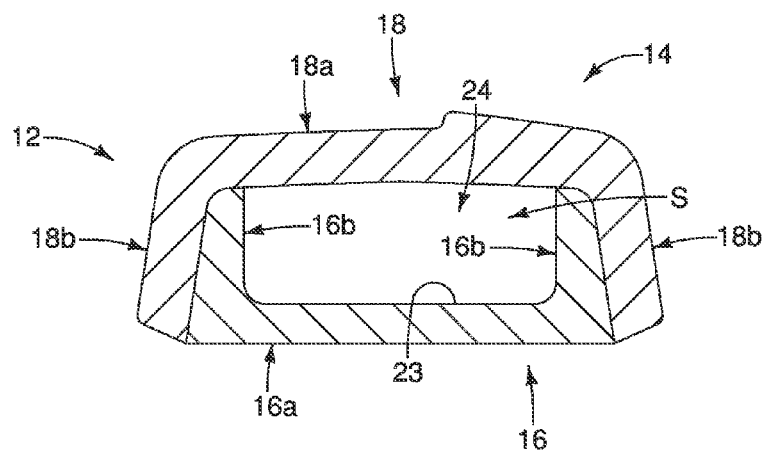
FIG. 11 is a cross sectional view of the first crank arm of the bicycle crank assembly taken along XI-XI line in FIG. 5.

As shown in FIGS. 6, 7, 9 and 10, the first crank part 16 has a first bottom portion 16a and a first wall portion 16b (e.g., a first side wall) at the crank main body 14. The first bottom portion 16a is thin-walled and extends in the radial direction of the crank axle 11. In particular, the first bottom portion 16a extends in the radial direction of the crank axle 11 from an peripheral edge part 22c of the cylindrical portion 22a of the crank axle supporting section 22 located in the first axial direction. The first bottom portion 16a has an inner bottom surface 23 that generally faces towards the first axial direction of the bicycle crank assembly 10. The first wall portion 16b is formed on an outer perimeter portion of the first bottom portion 16a. In the illustrated embodiment, the first wall portion 16b extends from the inner bottom surface 23 of the first bottom portion 16a in the first axial direction. The first bottom portion 16a and the first wall portion 16b define a second recessed part 24 of the first crank part 16 so that the first member (i.e., the first crank part 16) has the second recessed part 24. On the other hand, as shown in FIGS. 5, 6, 9, 11, the second crank part 18 has a second bottom portion 18a and a second wall portion 18b (e.g., a second side wall) at the crank main body 14. The second bottom portion 18a is arranged to face the first bottom portion 16a of the first crank part 16 such that the second bottom portion 18a covers the second recessed part 24 of the first crank part 16. The second wall portion 18b is formed on an outer perimeter portion of the second bottom portion 18a. In the illustrated embodiment, the second wall portion 18b extends from the second bottom portion 18a in the second axial direction. As a result, the internal space S is formed between the first and second crank parts 16 and 18. In particular, as seen in FIG. 7, the second recessed part 24 is recessed from the first side 20a of the first crank part 16 towards the second side 20b of the first crank part 16 such that the first and second crank parts 16 and 18 define the internal space S therebetween while the first and second crank parts 16 and 18 are attached to each other. In the illustrated embodiment, the first wall portion 16b and the second wall portion 18b are overlapped with each other while the first and second crank parts 16 and 18 are attached to each other. In particular, as best seen in FIG. 11, the second wall portion 18b is configured such that the second wall portion 18b closely contacts (i.e., mates) with the outside surface of the first wall portion 16b. The second wall portion 18b is joined to the first wall portion 16b with, for example, an adhesive.

Figure 9:
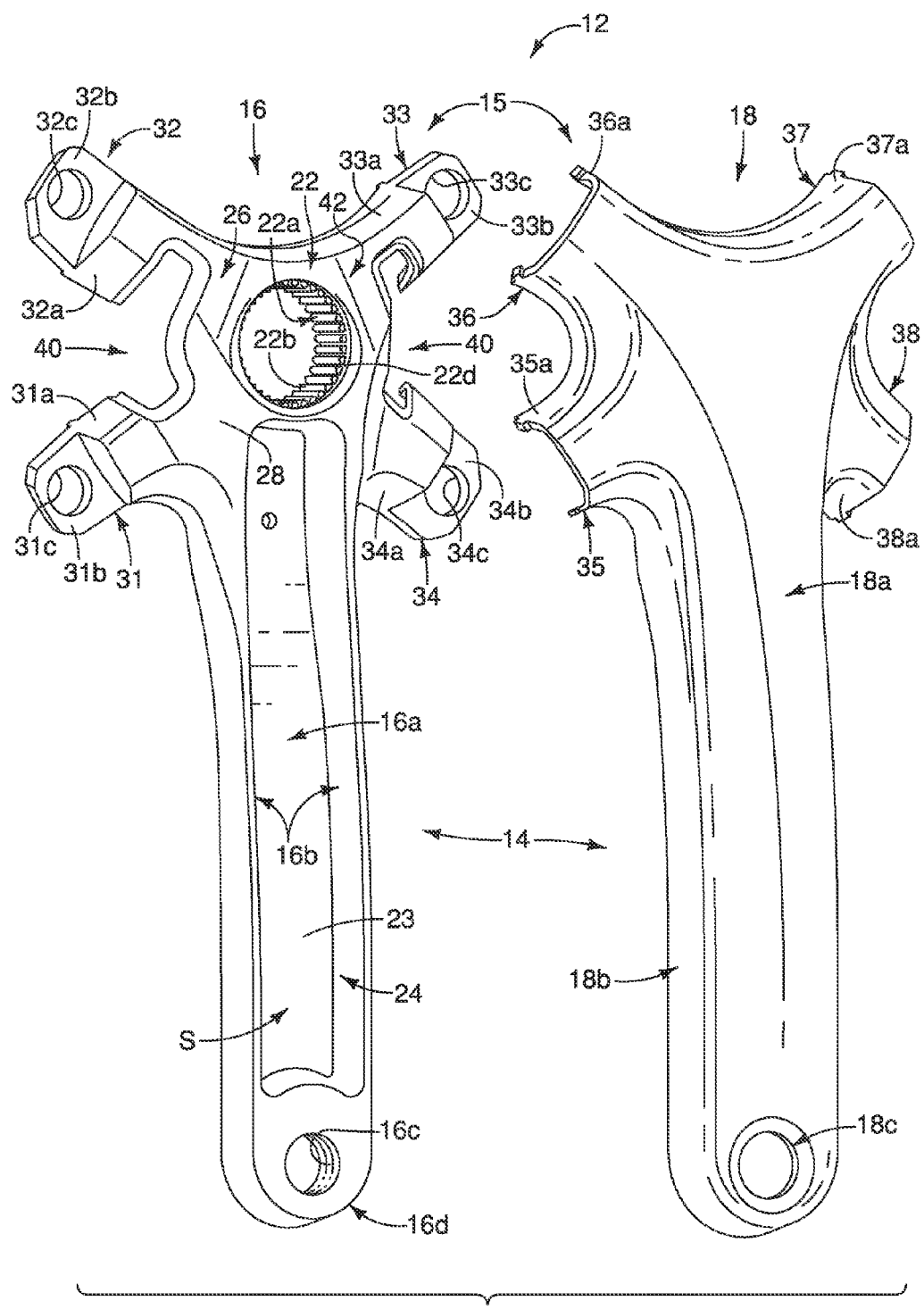
FIG. 9 is an exploded perspective view of the first and second crank parts (e.g., first and second members) of the first crank arm of the bicycle crank assembly illustrated in FIG. 1.

As shown in FIGS. 5 to 7 and 9, the first crank part 16 has a pedal axle mounting portion 16d (e.g., a pedal axle interacting portion). The pedal axle mounting portion 16d is provided on a tip end of the first crank part 16 at the crank main body 14. The pedal axle mounting portion 16d has a pedal axle mounting threaded hole 16c. In the illustrated embodiment, the second recessed part 24 is disposed between the crank axle supporting section 22 (i.e., the crank axle interacting portion) and the pedal axle mounting portion 16d (i.e., the pedal axle interacting portion). More specifically, as best seen in FIG. 9, the second recessed part 24 is disposed between the cylindrical portion 22a of the crank axle supporting section 22 and the pedal axle mounting threaded hole 16c of the pedal axle mounting portion 16d. On the other hand, the second crank part 18 has a through hole 18c. The through hole 18c is formed in a portion of the second crank part 18 that faces the pedal axle mounting threaded hole 16c. The through hole 18c is configured such that a pedal axle (not shown) can be passed therethrough.

Referring to FIGS. 5 to 11, the configurations of the sprocket mounting body 15 of the first crank arm 12 will be discussed in detail. The sprocket mounting body 15 extends from the crank main body 14 of the first crank part 16.

As shown in FIGS. 6 to 10, the first crank part 16 has a top portion 26 and first to fourth sprocket mounting arms 31 to 34 with side wall portions 31a to 34a, respectively, at the sprocket mounting body 15. The top portion 26 is thin-walled and extends in the radial direction of the crank axle 11. In particular, the top portion 26 extends in the radial direction of the crank axle 11 from an peripheral edge part 22d of the cylindrical portion 22a of the crank axle supporting section 22 located in the first axial direction. In other words, as best seen in FIG. 7, the top portion 26 is located in the first axial direction with respect to the first bottom portion 16a. The top portion 26 has an outer top surface 28 that generally faces towards the first axial direction of the bicycle crank assembly 10. The side wall portions 31a to 34a are formed on an outer perimeter portion of the top portion 26. In the illustrated embodiment, the side wall portions 31a to 34a extend from the top portion 26 towards the second axial direction with respect to the outer top surface 28 of the top portion 26. As shown in FIGS. 6 and 7, the top portion 26 and the side wall portions 31a to 34a define a first recessed part 30 of the first crank part 16 so that the first member has a crank axle interacting portion and a first recessed part. In the illustrated embodiment, the first recessed part 30 is disposed around the crank axle supporting section 22 (i.e., around the crank axle interacting portion). In particular, the first recessed part 30 is recessed from the second side 20b of the first crank part 16 towards the first side 20a of the first crank part 16 such that the first recessed part 30 includes an attachment area 42 attached to the second member (i.e., the second crank part 18) on the first side 20a. More specifically, the first recessed part 30 is recessed towards the first axial direction with respect to the peripheral edge part 22c of the cylindrical portion 22a of the crank axle supporting section 22, while the second recessed part 24 is recessed towards the second axial direction with respect to the peripheral edge part 22d of the cylindrical portion 22a of the crank axle supporting section 22. In the illustrated embodiment, as best seen in FIG. 6, the first recessed part 30 includes two separate sections about the circumferential direction of the crank axle 11. However, the shape of the first recessed part 30 can be different. For example, the first recessed part 30 can be configured such that the first recessed part 30 surrounds the entire periphery of the crank axle supporting section 22. As a result, it is possible to form, on the first side of the first member, a larger area to which the second member is attached with, for example, an adhesive than a conventional structure.

On the other hand, as shown in FIGS. 5 to 10, the second bottom portion 18a of the second crank part 18 has a shape that fits with the contour of the outer top surface 28 of the top portion 26 of the first crank part 16 at the sprocket mounting body 15. The second bottom portion 18a of the second crank part 18 is configured to contact with the top portion 26 of the first crank part 16. In other words, the outer top surface 28 of the top portion 26 of the first crank part 16 forms the attachment area 42 that is attached to the second crank part 18 on the first side 20a of the first recessed part 30 of the first crank part 16. In the illustrated embodiment, the outer top surface 28 of the first crank part 16 is fixed to the second bottom portion 18a of the second crank part 18 with, for example, an adhesive. The second crank part 18 also has first to fourth arm sections 35 to 38 with side wall portions 35a to 38a, respectively. The side wall portions 35a to 38a are formed on an outer perimeter portion of the second bottom portion 18a at the sprocket mounting body 15. In the illustrated embodiment, the side wall portions 35a to 38a extend from the second bottom portion 18a towards the second axial direction such that the side wall portions 35a to 38a of the second crank part 18 cover the side wall portions 31a to 34a of the first crank part 16, respectively. In the illustrated embodiment, the side wall portions 31a to 34a of the first crank part 16 and the side wall portions 35a to 38a are overlapped with each other while the first and second crank parts 16 and 18 are attached to each other. In particular, as best seen in FIG. 6, the side wall portions 35a to 38a are configured such that the side wall portions 35a to 38a closely contact (i.e., mate) with the outside surfaces of the side wall portions 31a to 34a, respectively. The side wall portions 35a to 38a are joined to the side wall portions 31a to 34a with, for example, an adhesive.

As illustrated in FIGS. 6 and 9, the first sprocket mounting arm 31 includes a first sprocket supporting portion 31b (e.g., a sprocket interacting portion) with a first sprocket mounting hole 31c at a radial end portion of the first sprocket mounting arm 31. The second sprocket mounting arm 32 includes a second sprocket supporting portion 32b (e.g., a sprocket interacting portion) with a second sprocket mounting hole 32c at a radial end portion of the second sprocket mounting arm 32. The third sprocket mounting arm 33 includes a third sprocket supporting portion 33b (e.g., a sprocket interacting portion) with a third sprocket mounting hole 33c at a radial end portion of the third sprocket mounting arm 33. The fourth sprocket mounting arm 34 includes a fourth sprocket supporting portion 34b (e.g., a sprocket interacting portion) with a fourth sprocket mounting hole 34c at a radial end portion of the fourth sprocket mounting arm 34. Each of the first to fourth sprocket supporting portions 31b to 34b is machined on both sides so as to be thinner than other portions. One of the sprockets (not shown) is fixed to outer surfaces of the first to fourth sprocket supporting portions 31b to 34b, while the other of the sprockets (not shown) is fixed to inner surfaces on the opposite side of the outer surfaces with shared fastening bolts.

Figure 5:
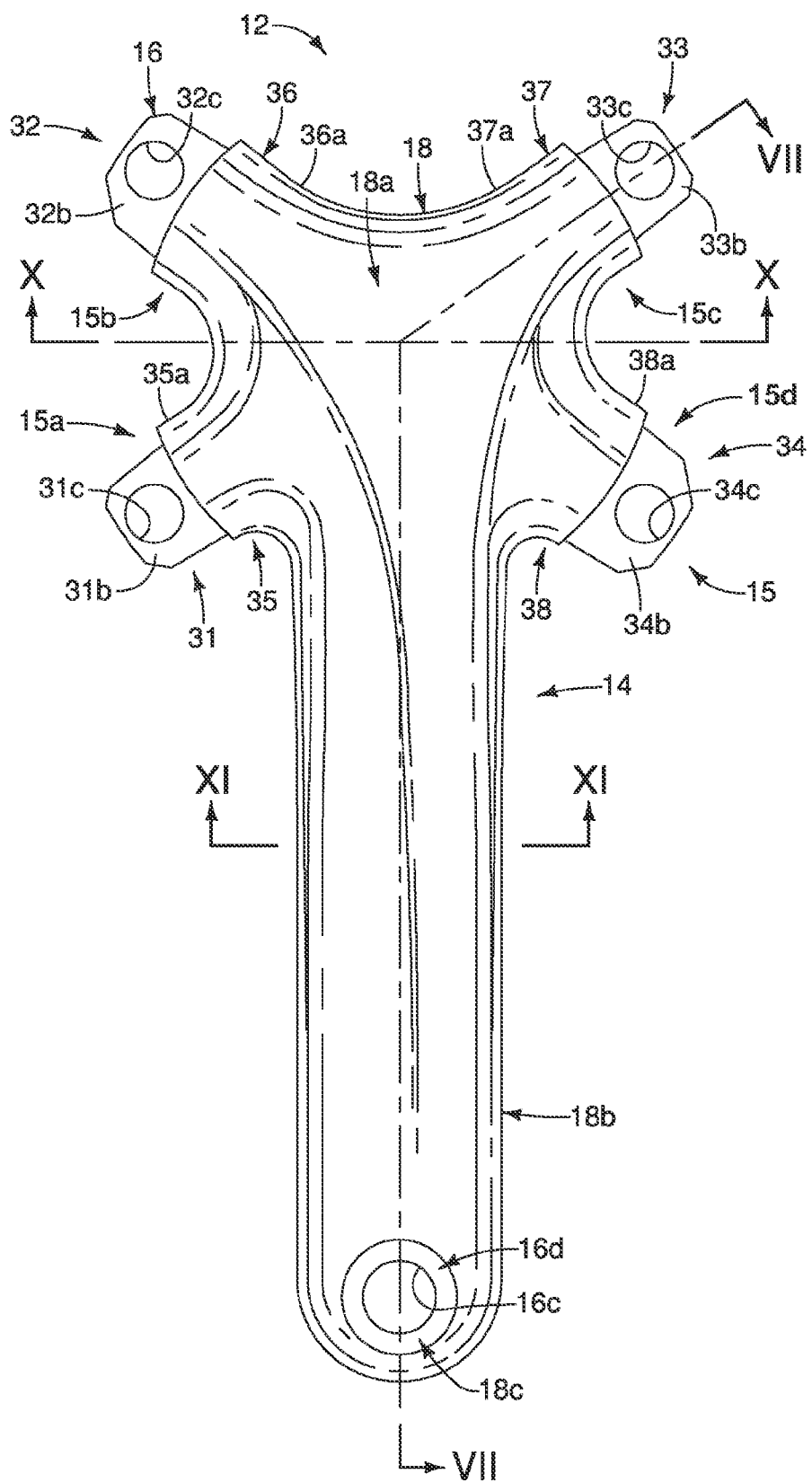
FIG. 5 is an outside elevational view of a first crank arm of the bicycle crank assembly illustrated in FIG. 1, with a second crank arm of the bicycle crank assembly removed from the bicycle crank assembly.

As illustrated in FIGS. 5 and 9, the first, second, third and fourth sprocket mounting arms 31, 32, 33 and 34 are arranged sequential order as one moves from the crank main body 14 in the clockwise direction of the bicycle crank assembly 10 upon having a view of the first side 20a. As mentioned above, the second crank part 18 also has the first to fourth arm sections 35 to 38. As best seen in FIG. 5, the first to fourth arm sections 35 to 38 cover portions of the first to fourth sprocket mounting arms 31 to 34 other than the first to fourth sprocket supporting portions 31b to 34b, respectively. Thus, in the illustrated embodiment, the sprocket mounting body 15 has first to fourth arms 15a to 15d that are formed by the first to fourth sprocket mounting arms 31 to 34 of the first crank part 16 and the first to fourth arm sections 35 to 38 of the second crank part 18, respectively. In the illustrated embodiment, as seen in FIG. 5, the circumferential spacing between the first and second arms 15a and 15b and the circumferential spacing between the third and fourth arms 15c and 15d are preferably equal. Meanwhile, the circumferential spacing between the second and third arms 15b and 15c is preferably larger than the circumferential spacing between the first and second arms 15a and 15b. Furthermore, the circumferential spacing between the second and third arms 15b and 15c and the circumferential spacing between the fourth and first arms 15d and 15a are preferably equal.

In the illustrated embodiment, large loads during pedaling occur at places between the first and second arms 15a and 15b and between the third and fourth arms 15c and 15d. However, the bicycle crank assembly 10 is configured such that the circumferential spacing between the first and second arms 15a and 15b and between the third and fourth arms 15c and 15d is narrower. In this way, the rigidity of the bicycle crank assembly 10 is improved in an effective manner. Also, in the illustrated embodiment, the bicycle crank assembly 10 is also configured such that the rigidities of the second and fourth arms 15b and 15d are higher than the rigidities of the first and third arms 15a and 15c. Since the first and third arms 15a and 15c require smaller rigidities during pedaling, the structures of the first and third arms 15a and 15c can be focused on weight-saving more. Alternatively, the rigidities of the first to fourth arms 15a to 15d can be set differently from above as desired or needed. In the illustrated embodiment, as shown in FIG. 9, the first crank part 16 includes a pair of slots or cut-offs 40. The slots 40 circumferentially extends about the crank axle supporting section 22 at locations between the first and second sprocket mounting arms 31 and 32 and between the third and fourth sprocket mounting arms 33 and 34. In the illustrated embodiment, the slots 40 are radially disposed between the crank axle supporting section 22 and the first to fourth sprocket supporting portions 31b to 34b. In other words, the first member can have a sprocket interacting portion, and can preferably have a slot that is disposed between the crank axle interacting portion and the sprocket interacting portion. The slots 40 radially outwardly open between the first and second sprocket mounting arms 31 and 32 and between the third and fourth sprocket mounting arms 33 and 34. As a result, the overall weight of the bicycle crank assembly 10 can be reduced.

Figure 1:
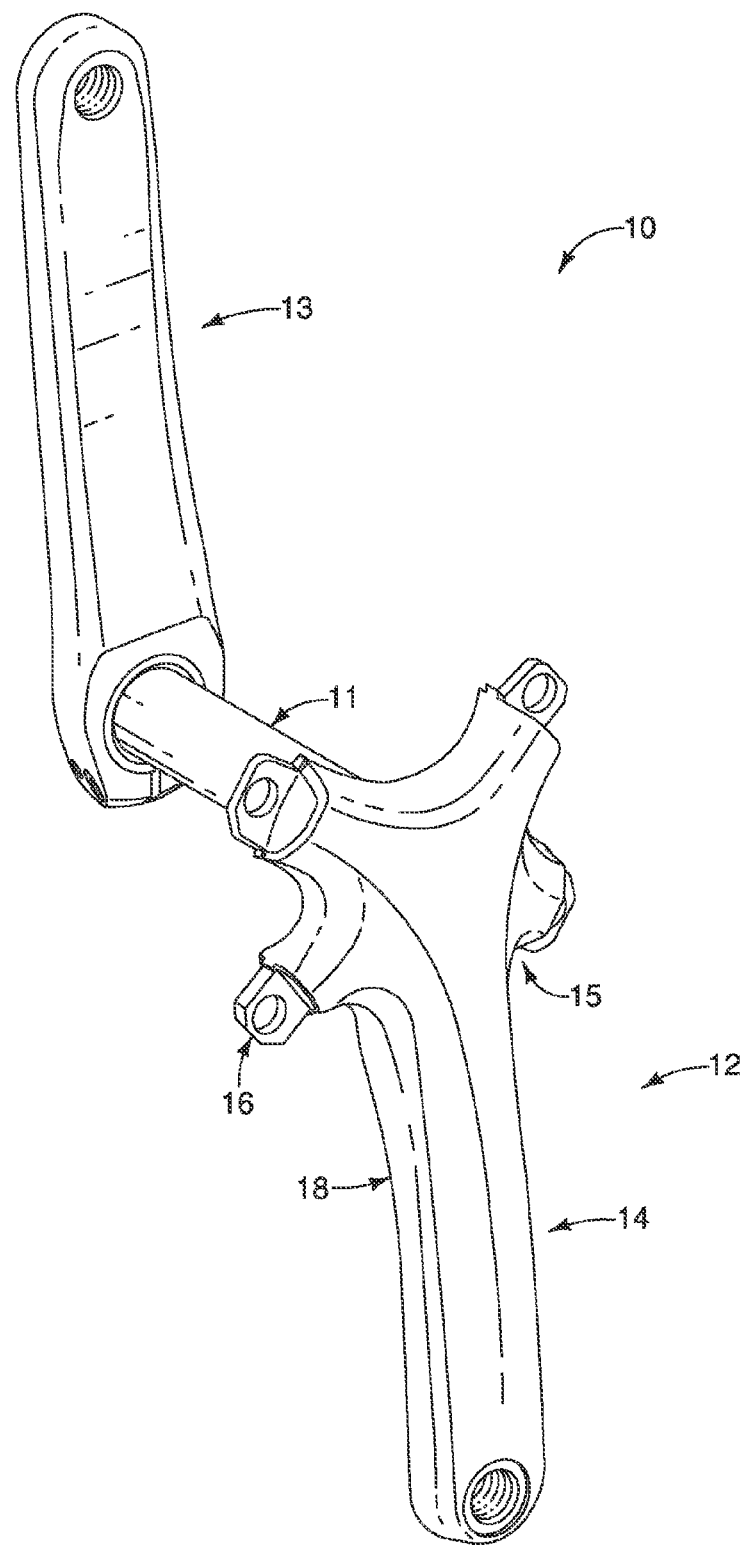
FIG. 1 is a perspective view of a bicycle crank assembly in accordance with one embodiment.
Figure 2:
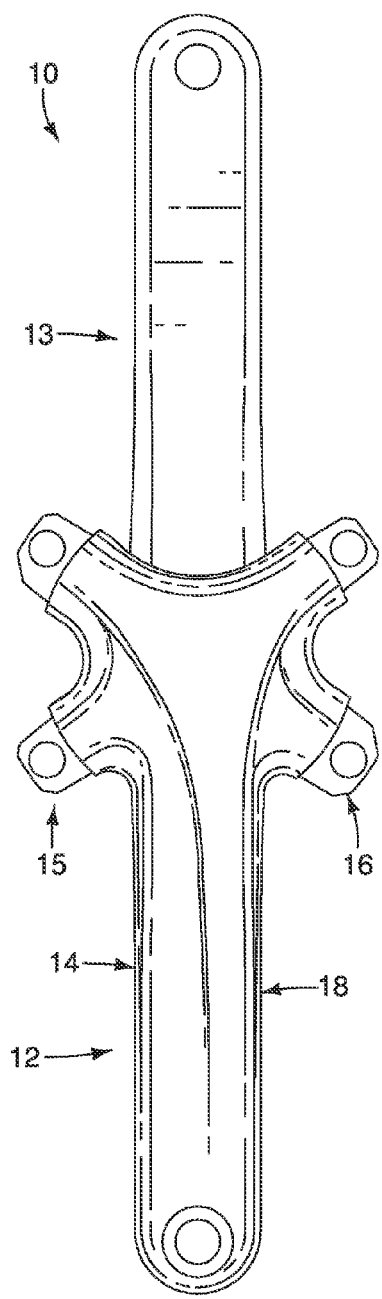
FIG. 2 is an outside elevational view of the bicycle crank assembly illustrated in FIG. 1.
Figure 3:
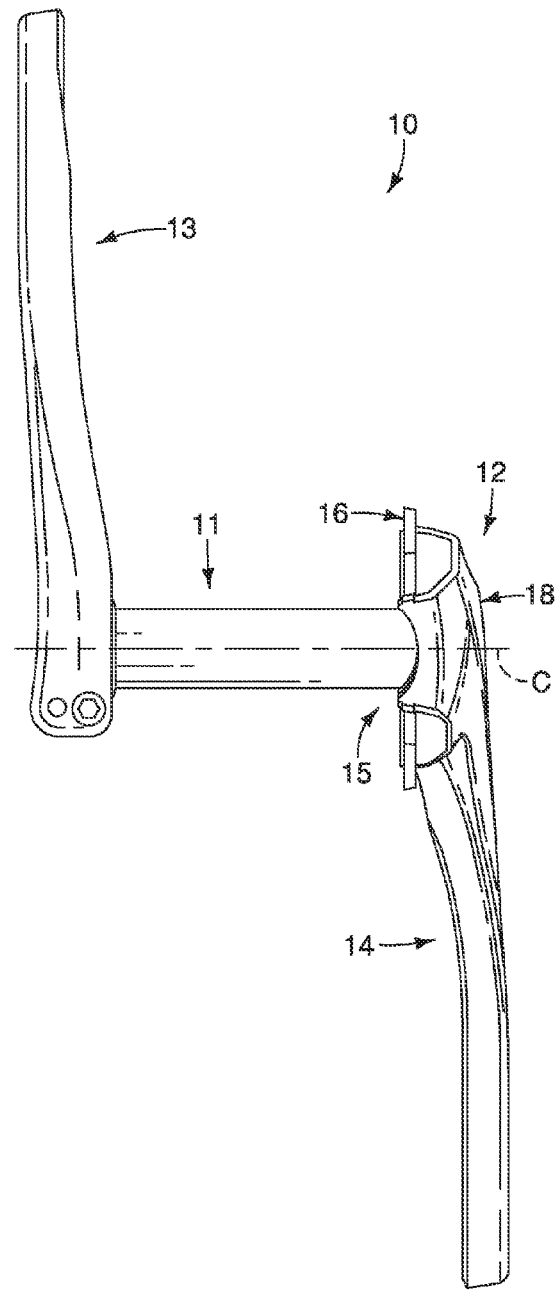
FIG. 3 is a rear side elevational view of the bicycle crank assembly illustrated in FIG. 1.
Figure 4:
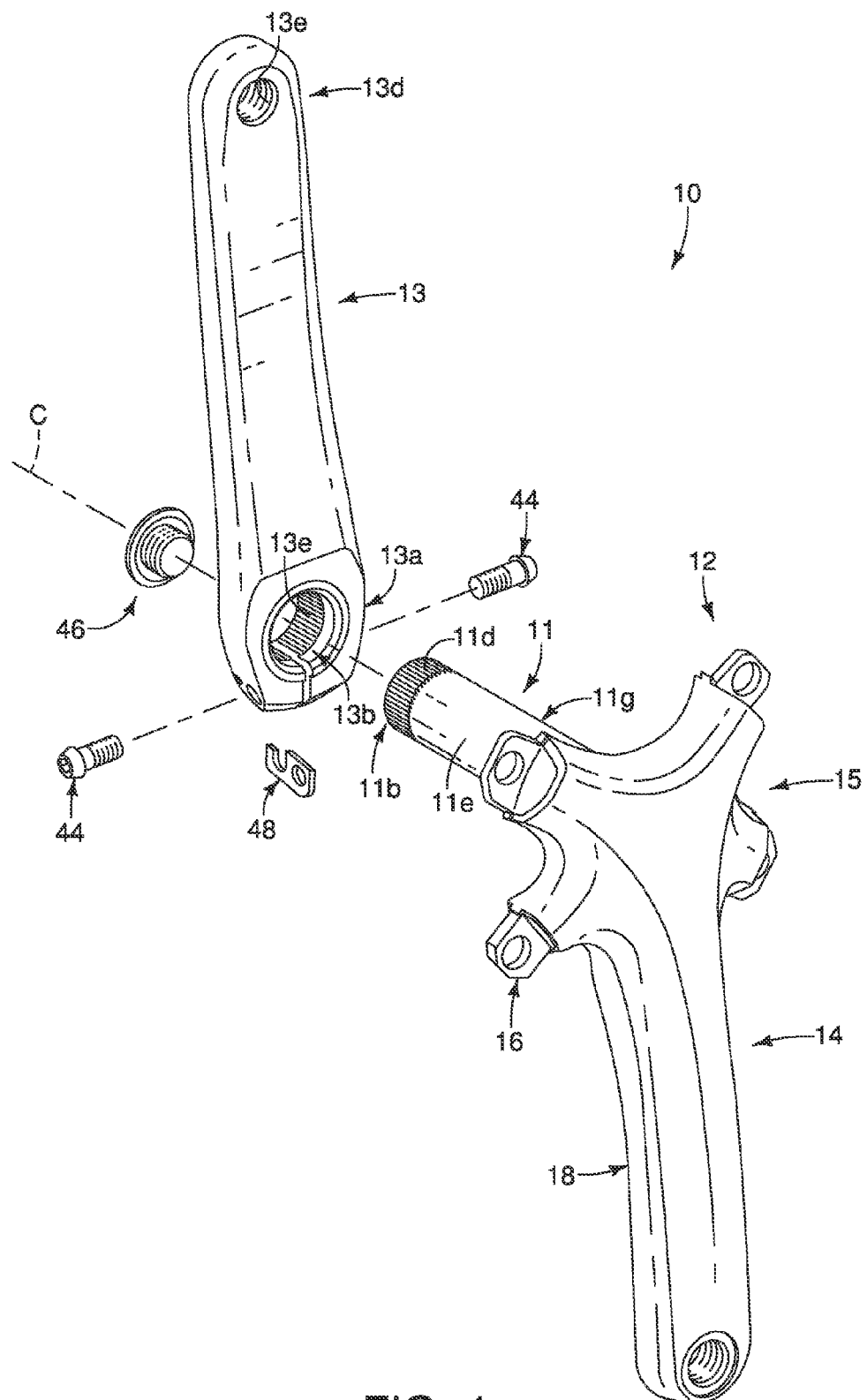
FIG. 4 is an exploded perspective view of the bicycle crank assembly illustrated in FIG. 1.
Figure 12:
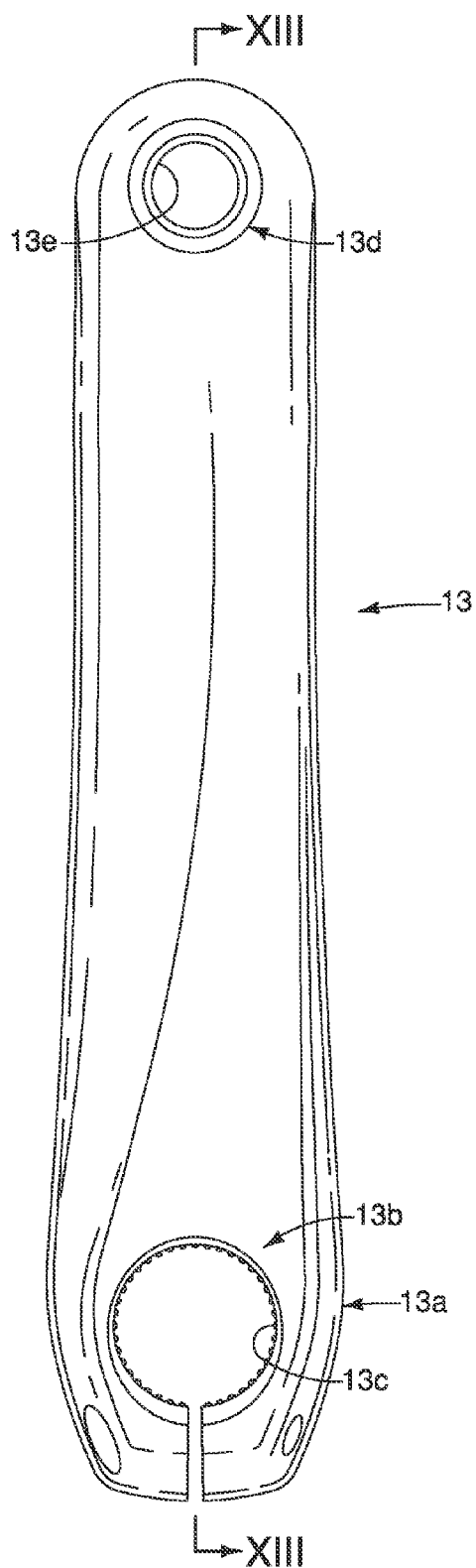
FIG. 12 is an outside elevational view of the second crank arm of the bicycle crank assembly illustrated in FIG. 1.
Figure 13:
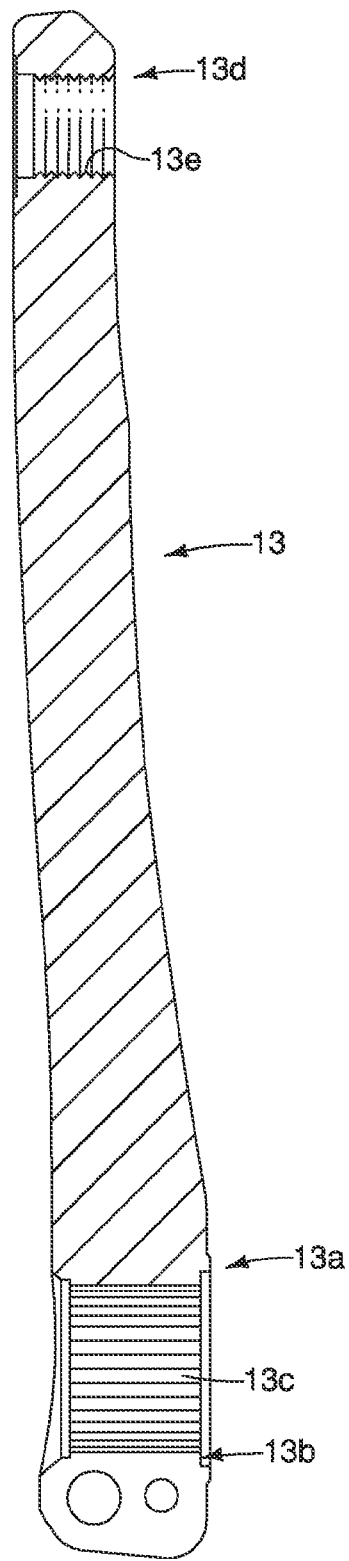
FIG. 13 is a cross sectional view of the second crank arm of the bicycle crank assembly taken along XIII-XIII line in FIG. 12.

As illustrated in FIGS. 12 and 13, the second crank arm 13 is integrally formed as a one-piece, unitary member from a metallic material or any other suitable material. In other words, the bicycle crank assembly according to the present application comprises a first crank arm including a first member and a second member that is attached to the first member, and a second crank arm formed as a one-piece unitary member. As a result, the weight of the first crank arm can be reduced because of the multi-piece structure whereas the manufacturing cost of the second crank arm can be reduced due to the unitary-piece structure, for example, to which a forging process is applicable. Thus, in the illustrated embodiment, the second crank arm 13 is preferably a forged member that is made by a forging process. In particular, the second crank arm 13 can be a forged member that is made by a cold forging process. As seen in FIG. 4, the second crank arm 13 is releasably and fixedly coupled to the crank axle 11. The second crank arm 13 has a crank axle supporting section 13a with an axle receiving opening 13b. In the illustrated embodiment, a plurality of internal splines 13c are formed on an internal surface of the axle receiving opening 13b of the crank axle supporting section 13a. The internal splines 13c are configured to engage with the second splines 11d of the second end portion 11b of the crank axle 11 such that the second crank arm 13 and the crank axle 11 rotate as a unit. The crank axle 11 is inserted into the axle receiving opening 13b. The second end portion 11b of the crank axle 11 is fixed to the second crank arm 13 by a pair of mounting fasteners 44, such as clamp bolts preferably. The mounting fasteners 44 attach the second crank arm 13 to the second end portion 11b of the crank axle 11 in a releasable and reinstallable manner. In the illustrated embodiment, the second crank arm 13 is secured to the second end portion 11b of the crank axle 11 with a fixing bolt 46. The mounting fasteners 44 can be omitted if the second splines 11d of the crank axle 11 is designed to be tapered splines and the fixing bolt 46 is used to secure the second crank arm 13 to the second end portion 11b of the crank axle 11. Optionally, the second crank arm 13 includes a retaining member 48 which is a plate-shaped member for preventing the second crank arm 13 from dropping off from the crank axle 11 even if the mounting fasteners 44 become loose and the fixed bolt 46 has fallen off. The retaining member 48 is a conventional structure and thus will not be discussed in further detail herein. Furthermore, in the illustrated embodiment, the second crank arm 13 has a pedal axle mounting portion 13d. The pedal axle mounting portion 13d is provided on a tip end of the second crank arm 13. The pedal axle mounting portion 13d has a pedal axle mounting threaded hole 13e. The pedal axle mounting portion 13d is configured such that a pedal axle (not shown) is threaded into the pedal axle mounting threaded hole 13e of the pedal axle mounting portion 13d. In the illustrated embodiment, as shown in FIG. 4, the crank axle 11 is fixedly coupled to the first crank arm 12 in a pre-assembled state. In particular, the crank axle 11 is coupled to the first crank arm 12 before the crank axle 11 is mounted to the bottom bracket hanger of the bicycle frame. Then, the second crank arm 13 is attached to the second end portion 11b of the crank axle 11 in a releasable and reinstallable manner. Preferably, the crank axle 11 is fixedly coupled to the first crank arm 12 in a press-fit manner. Alternatively, the crank axle 11 can also be fixedly coupled to the first crank arm 12 with an adhesive.

In the illustrated embodiment, the first crank part 16 and the second crank part 18 are fixedly coupled to each other with, for example, an adhesive. Specifically, the second bottom portion 18a of the second crank part 18 has a shape that fits with the contour of the outer top surface 28 of the top portion 26 of the first crank part 16. The outer top surface 28 of the top portion 26 of the first crank part 16 contacts with the second bottom portion 18a of the second crank part 18 in a planar fashion. In particular, the attachment area 42 of the first crank part 16 continuously extend from the crank axle supporting section 22 towards the first to fourth sprocket mounting arms 31 to 34. Thus, the first crank part 16 can include a larger attachment area 42 on which the adhesive can be applied and to which the second bottom portion 18a of the second crank part 18 is attached. Accordingly, the first and second crank parts 16 and 18 can be securely coupled to each other.

Figure 14:
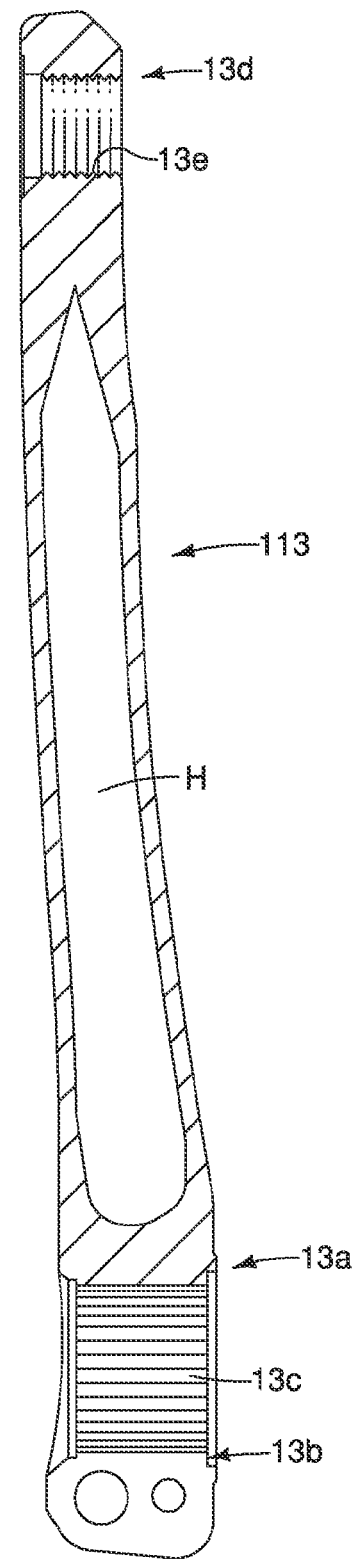
FIG. 14 is a cross sectional view of a modified second crank arm of the bicycle crank assembly in accordance with another embodiment.

In the illustrated embodiment, as shown in FIG. 13, the second crank arm 13 has a solid structure. Alternatively and preferably, as illustrated in FIG. 14, a modified second crank arm 113 can have a hollow structure. The second crank arm 113 is integrally formed as a one-piece, unitary member from a metallic material or any other suitable material. The second crank arm 113 is identical to the second crank arm 13 shown in FIG. 13, except that the second crank arm 113 includes a hollow portion H. Thus, the detailed configuration of the second crank arm 113 will not be discussed for the sake of brevity.

In the illustrated embodiment, as shown in FIG. 8, the first end portion 11a of the crank axle 11 has the projection 11f. Alternatively, the projection 11f can be removed from the first end portion 11a. In this case, the modified first end portion can be inserted into the cylindrical portion 22a from the second side 20b of the first crank part 16 and can be fixed to the first crank part 16, for example, by swaging and/or with an adhesive.

In the illustrated embodiment, as shown in FIG. 5, the first crank part 16 has four arms 15a to 15d for mounting the sprockets. Alternatively, the number of the arms of the first crank part for mounting the sprockets can be more than four (five for example), or less than four (three for example). In this case, the number of the sprocket mounting arms of the first crank part 16 and the number of the arm sections of the second crank part 18 can be more than four, or less than four.

In the illustrated embodiment, as shown in FIG. 7, the first crank part 16 has the crank axle supporting section 22 that is coupled to the crank axle 11. Alternatively, the second crank part 18 can include a crank axle supporting section that is directly coupled to the crank axle 11. In this case, the crank axle supporting section is integrally formed with the second bottom portion 18a of the second crank part 18. This crank axle supporting section of the second crank part 18 can be identical to the crank axle supporting section 22. Thus, the detailed configuration of this crank axle supporting section will be omitted for the sake of brevity. In this case, the first crank part 16 has a through opening (e.g., a crank axle interacting portion) at the crank main body 14 that has a larger diameter than that of the first end portion 11a of the crank axle 11. Then, the first and second crank parts 16 and 18 are configured such that the crank axle supporting section of the second crank part 18 extends through the through opening of the first crank part 16. In particular, an external surface of this crank axle supporting section of the second crank part 18 is fitted to the through opening of the first crank part 16.

In the illustrated embodiment, as shown in FIG. 7, the first crank part 16 has the pedal axle mounting portion 16d with the pedal axle mounting threaded hole 16c. Alternatively, the second crank part 18 can include a cylindrical pedal axle mounting portion with a pedal axle mounting threaded hole. The pedal axle is threaded to the pedal axle mounting threaded hole of the cylindrical pedal axle mounting portion of the second crank part 18. In this case, the cylindrical pedal axle mounting portion is integrally formed with the second crank part 18 such that the cylindrical pedal axle mounting portion extends from the second bottom portion 18a of the second crank part 18. In this case, the first crank part 16 has a through opening (e.g., a pedal axle interacting portion). The first and second crank parts 16 and 18 are configured such that this cylindrical pedal axle mounting portion of the second crank part 18 extends through the through opening of the first crank part 16. In particular, an external surface of this cylindrical pedal axle mounting portion of the second crank part 18 is fitted to the through opening of the first crank part 16.

In the illustrated embodiment, as shown in FIG. 9, the first crank part 16 has the first to fourth sprocket supporting portions 31b to 34b with the first to fourth sprocket mounting holes 31c to 34c, respectively. Alternatively, the first to fourth arm sections 35 to 38 of the second crank part 18 can include first to fourth sprocket supporting portions with first to fourth sprocket mounting holes, respectively. In this case, the first to fourth sprocket supporting portions of the second crank part 18 can be identical to the first to fourth sprocket supporting portions 31b to 34b, except for the location. Thus, the detailed configuration of the first to fourth sprocket supporting portions of the second crank part 18 will be omitted for the sake of brevity. In this case, the sprockets are fixedly coupled to the first to fourth sprocket supporting portions of the second crank part 18.

The term "comprising" and its derivatives, as used herein, are intended to be open ended terms that specify the presence of the stated features, elements, components, groups, integers, and/or steps. This definition also applies to words of similar meaning, for example, the terms "have", "include" and their derivatives. The term "attached" or "attaching", as used herein, encompasses configurations in which an element directly secured to another element by affixing the element is directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. The term "contact" as used herein, encompasses configurations in which an element directly contacts another element; and configurations in which the element indirectly contacts the other element through adhesive. The term "member" when used in the singular can have the dual meaning of a single element or plurality of elements.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle crank arm comprising:
    a first member having a crank axle interacting portion including a crank axle receiving portion configured to receive a crank axle, a pedal axle interacting portion configured to receive a pedal axle, and a first recessed part around the crank axle receiving portion, the first member being formed as a one-piece unitary member; and
    a second member directly attached to the first member continuously around the crank axle receiving portion to define an attachment area between the first and second members, the second member being formed as a one-piece unitary member,
    the first member having a first side facing the second member and a second side opposite to the first side, the first side being an internal surface of the bicycle crank arm, the second side being an external surface of the bicycle crank arm, the first recessed part defining a recess of the second side, the first recessed part defining the attachment area on the first side of the first member that is attached to the second member.

2. The bicycle crank arm according to claim 1, wherein the first and second members are fixedly coupled to each other with an adhesive.

3. The bicycle crank arm according to claim 1, wherein the crank axle interacting portion of the first member is configured to be fixedly coupled to the crank axle in a press-fit manner.

4. The bicycle crank arm according to claim 1, wherein the crank axle interacting portion of the first member is configured to be fixedly coupled to the crank axle with an adhesive.

5. The bicycle crank arm according to claim 1, wherein the first member further has a sprocket interacting portion and a slot that is disposed between the crank axle interacting portion and the sprocket interacting portion.

6. The bicycle crank arm according to claim 1, wherein the first member has a first side wall, and the second member has a second side wall.

7. The bicycle crank arm according to claim 6, wherein the first side wall overlaps with the second side wall while the first member is attached to the second member.

8. The bicycle crank arm according to claim 1, wherein the first member further has a second recessed part that is disposed between the crank axle interacting portion and the pedal axle interacting portion.

9. The bicycle crank arm according to claim 8, wherein the second recessed part is recessed from the first side toward the second side such that the first and second members define an interior space therebetween while the first and second members are attached to each other.

10. The bicycle crank arm according to claim 1, wherein the crank axle includes a first end portion with a plurality of first splines, a second end portion with a plurality of second splines, and an intermediate portion that is disposed between the first and second end portions.

11. The bicycle crank arm according to claim 10, wherein the crank axle further includes a projection that is positioned axially outward relative to the first splines at the first end portion,
    the first splines extend radially outward relative to an external surface of the intermediate portion, and
    the second splines do not extend radially outward relative to the external surface of the intermediate portion.

12. The bicycle crank assembly according to claim 1, further comprising
    a second crank arm that is a one-piece, forged member.

13. The bicycle crank assembly according to claim 12, wherein
    the first and second members are fixedly coupled to each other with an adhesive.

14. The bicycle crank assembly according to claim 12, wherein
    the second crank arm has a hollow structure.

15. The bicycle crank assembly according to claim 12, further comprising a crank axle fixedly coupled to the first crank arm in a pre-assembled state.

16. The bicycle crank assembly according to claim 15, wherein
the crank axle is fixedly coupled to the first crank arm in a press-fit manner.

17. The bicycle crank assembly according to claim 15, wherein
the crank axle is fixedly coupled to the first crank arm with an adhesive.

18. The bicycle crank assembly according to claim 15, wherein
the second crank arm a cold forged member.

19. The bicycle crank assembly according to claim 15, wherein
the crank axle includes a first end portion with a plurality of first splines, a second end portion with a plurality of second splines, and an intermediate portion that is disposed between the first and second end portions.

20. The bicycle crank assembly according to claim 19, wherein
the crank axle further includes a projection that is positioned axially outward relative to the first splines at the first end portion,
the first splines extend radially outward relative to an external surface of the intermediate portion, and
the second splines do not extend radially outward relative to the external surface of the intermediate portion.

* * * * *